March 30, 1954  A. G. CARTER  2,673,469
WHEEL ASSEMBLY
Filed May 13, 1948

Andrew G. Carter
INVENTOR.

-BY-
Attorney

Patented Mar. 30, 1954

2,673,469

UNITED STATES PATENT OFFICE 2,673,469

WHEEL ASSEMBLY

Andrew G. Carter, Grand Rapids, Mich.

Application May 13, 1948, Serial No. 26,787

3 Claims. (Cl. 74—230.7)

This invention provides for the securing of peripheral surface members to wheels against axial displacement. The use of specialized surfaces for wheels has long been known. A great variety of situations exist in which particular surface characteristics are desired, and which are not to be obtained if the stress-carrying material of the wheel is left exposed. The transfer of power from one shaft to another, or the guiding of a running band or strip along a particular path requires a wheel having traction and cushioning qualities on its surface. The use of rubber for such a surface has been found to give satisfactory results as far as the cushioning and traction aspects are concerned. The problem immediately presents itself, however, of adequately securing the rubber surface member to the wheel so that the stresses will be properly conducted from such member to the wheel. The usual practice has been to cement a rubber strip around the periphery of the wheel, and rely upon the action of the cement to adequately secure the rubber to the wheel against both the action of centrifugal force and that of miscellaneous axial forces. The general failure of a glue joint to perform this function has given rise to the widespread use of the type of metal-cored surface member which is described in my patents carrying the following numbers: 1,593,751; 1,765,402; 1,765,403; 1,811,916; 1,898,031; and 1,914,487. The above listed patents illustrate surface members which have rubber inner and outer portions, these portions being secured in position against centrifugal force by the circumferential tension developed in a metal core. These patents also illustrate several different arrangements for securing this surface member in position. All of these securing arrangements, however, involve the expense of a considerable number of parts and require that a certain amount of attention be devoted to such assemblies to assure that the various parts continue to operate in their proper positions. As illustrated in these patents, the greatest field of utility that has been found for this development is in connection with wheels for band saws. As outlined above the expense of the variety of parts which has hitherto been necessary to secure such surface members in position has raised the total cost of the band saw wheel so equipped to a point that the use of metal-cored surface members has generally been limited to relatively expensive and heavy duty machines. For this reason the advantages of the separately molded metal-cored band saw tire have not been available in low cost band saws until the advent of the present invention.

With the metal core, it is obvious that problems relating to centrifugal force alone are no longer of any particular concern. The one remaining problem is to secure the surface member, or tire, against axial displacement relative to the wheel. Such displacement may be caused by forces encountered during the operation of the wheel, or by vibration or improper adjustment of the machine as a whole. It is the particular concern of the present invention to provide for securing such tires in position at a minimum of expense both as to the labor of installation and as to the cost of fabricating the components. The use of bolts and nuts, clinch-rings, and other extra parts are for the most part entirely avoided by this invention, with the result that the balancing of a band saw wheel is not seriously disturbed by the installation of a surface member according to the arrangement outlined herein.

The attachment of a tire to a wheel according to this invention is accomplished through the action of one or more yieldable engaging elements which are so designed and disposed that they are not capable of working loose or of being accidentally displaced from locking position. Such engaging elements are also adapted to provide for the installation of the tire upon the wheel by being forcibly displaced from locking position. When yieldable engaging elements are used, the yielding action provided for is preferably in such direction that it allows the engaging member to be forced out of locking position. It is also preferable that the direction in which this yielding action occurs should be a different direction from that of the forces encountered in locking. It is contemplated that these engaging elements may be formed integrally with either the wheel or the surface member, or may be formed as separate components held in position either through special fastenings or being confined between the surface member and the wheel. It has been found convenient, and in fact preferable, to form such engaging elements as a leaf spring which is stamped out of the material of the core.

The yielding action of these engaging elements takes place in a substantially radial direction. Obviously the locking forces occur in a substantially axial direction with respect to the wheel, and with the yielding forces so disposed it is not possible to withdraw the tire from the wheel without destroying or deforming the engaging elements. As a matter of fact, the customary procedure for removing such a tire is to cut the same through the metal core member with a hack saw. If desired, however, access may be provided through suitable openings in the wheel for the insertion of tools to disengage these elements, or an auxiliary portion of such element may be allowed to protrude through the inner portion of the rim where it can be easily grasped to effect such disengagement.

The locking action of the engaging elements is produced by their cooperation with a groove or keyway in the peripheral surface of the rim. The sides of the keyway are preferably in planes perpendicular to the axis of the wheel to retain the engaging element securely. With this arrangement, the tire may be slipped over the rim of the wheel with the engaging element forced outwardly by the application of force thereto, or by the action of a bevelled edge on the rim. When once over the rim, the engaging element moves over the surface of the wheel until it drops into the annular keyway. The tire is then permanently locked in position.

This invention will be described by an analysis of the details of particular pieces of equipment which are illustrated in the accompanying drawings. In these drawings.

Figure 1:
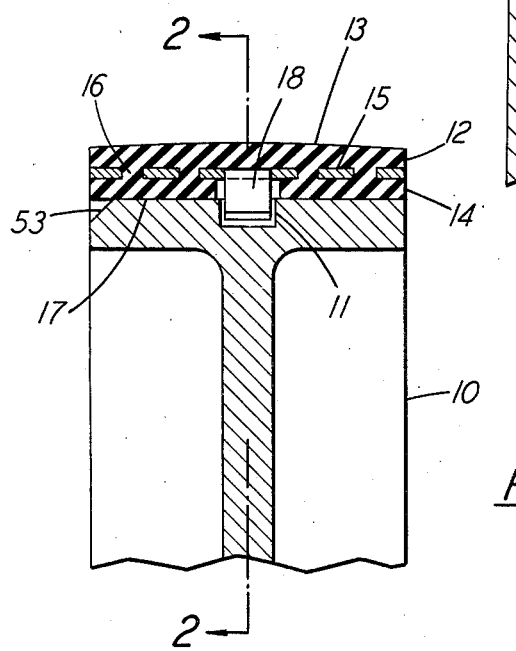
Figure 1 is a section through a wheel taken on a plane containing the axis of the wheel. This section illustrates the use of a yieldable engaging element which is formed integrally with the metal core of a tire.

Referring to Figure 1, the band saw wheel 10 is shown formed with the annular outwardly-opening groove 11. The surface member or tire 12 comprises the outer portion 13, the inner portion 14, and the core member 15. This core member may be formed with a great number of apertures 16 which act as communicating passages for the rubber or similar material which forms the outer and inner portions 13 and 14. The outer portion 13 may then be secured in position against centrifugal force by the tension stresses which are generated within the rubber-like material in the communicating passages 16. The inner portion 14 is of course retained in position against centrifugal force by circumferential tension generated within the core member 15.

Figure 2:
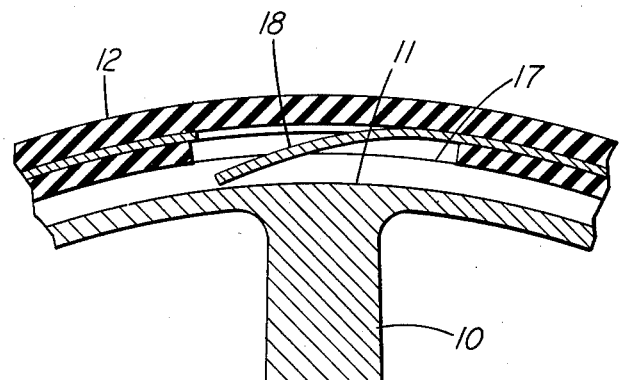
Figure 2 is a section along the plane 2—2 of Figure 1.

The inner diameter 17 of the tire 12 is adapted to fit closely over the outer diameter of the wheel 10. The tire 12 is secured against axial displacement by the engagement of the yieldable engaging element 18 with the annular groove 11. The manner in which the engaging element 18 cooperates with the annular groove 11 is clearly illustrated in Figure 2. Assembly of the complete wheel is accomplished by forcing the tire axially along the wheel from the left (with reference to Figure 1) until the engaging element 18 drops into engagement with the annular groove 11 through its spring action. The engaging element first bears against the bevelled edge 53, causing the element to be forced outwardly and pass over the outer diameter of the rim. The strength of this spring action is such that centrifugal force which may be encountered during the operation of the wheel is not sufficient to cause the spring to move outwardly enough to disengage it from the groove 11. With this arrangement, the tire 12 is permanently locked in alignment with the wheel 10, and will remain so until forcibly removed or cut with a saw.

The particular parts and assemblies which are shown in the accompanying drawings and described herein are for illustrative purposes only, and are not to be taken as a limitation upon the scope of the claims appended hereto.

I claim:

1. A wheel assembly, comprising: a rim having at least one substantially cylindrical outer surface, said surface being axially unobstructed from at least one direction, and having an annular outwardly opening groove in said cylindrical surface; and an annular surface member for said cylindrical surface having an inner diameter adapted to a force fit with the said cylindrical surface, and having yieldable engaging elements disposed to engage said groove to locate said surface member on said rim, said engaging elements normally projecting inward from the inner diameter of said surface member and adapted to move outward only under greater radial force than that encountered in the operation of said wheel to permit the insertion of said rim within said surface member.

2. A wheel assembly, comprising: a rim having at least one substantially cylindrical outer surface provided with an annular groove, said surface being axially unobstructed from at least one direction; a tire adapted to fit closely over said surface, said tire having an annular metal core provided with leaf-spring portions displaced radially inward from said core and forming resiliently yieldable engaging means disposed to lock said tire to said groove to align the same, said engaging means being adapted to resiliently deflect to non-engaging position under the influence of radial forces greater than those encountered in the operation of said wheel.

3. A tire for a wheel, said tire having an annular metal core provided with leaf-spring portions displaced radially inward from said core and forming resiliently yieldable engaging means disposed to lock said tire in position on said wheel, said engaging means being adapted to resiliently deflect to non-engaging position under the influence of radial forces greater than those encountered in the operation of said wheel.

ANDREW G. CARTER.

References Cited in the file of this patent

UNITED STATES PATENTS

| Number | Name | Date |
|---|---|---|
| 583,865 | Cowen | June 1, 1897 |
| 584,059 | Mann | June 8, 1897 |
| 705,072 | Grant | July 22, 1902 |
| 1,164,946 | Lynch | Dec. 21, 1915 |
| 1,765,402 | Carter | June 24, 1930 |
| 1,900,835 | Meredith | Mar. 7, 1933 |
| 2,369,635 | Bacon | Feb. 20, 1945 |
| 2,597,858 | Freedlander | May 27, 1952 |

FOREIGN PATENTS

| Number | Country | Date |
|---|---|---|
| 282,893 | Great Britain | of 1927 |